(No Model.)　　　　　　　　　　　　　　3 Sheets—Sheet 1.
E. L. WELCH.
CORN HARVESTER.

No. 552,022.　　　　　　　　　　Patented Dec. 24, 1895.

Witnesses_
Geo. E. Frech
James W. Berard.

Inventor_
E. L. Welch,
per
Lehmann Pattison Nesbit
Attys (No Model.)  
3 Sheets—Sheet 2.

E. L. WELCH.
CORN HARVESTER.

No. 552,022. Patented Dec. 24, 1895.

WITNESSES  
Geo. E. Frech  
James W. R. Binney

INVENTOR  
E. L. Welch  
per Lehmann Pattison  
atty (No Model.) 3 Sheets—Sheet 3.

E. L. WELCH.
CORN HARVESTER.

No. 552,022. Patented Dec. 24, 1895.

WITNESSES
Geo. E. Frech
James W. Berans

INVENTOR
E. L. Welch
per
Lehmann Pattison & Nesbit
attys

UNITED STATES PATENT OFFICE.

EMERY L. WELCH, OF DELPHOS, OHIO.

CORN-HARVESTER.

SPECIFICATION forming part of Letters Patent No. 552,022, dated December 24, 1895.

Application filed August 11, 1894. Serial No. 520,066. (No model.)

*To all whom it may concern:*

Be it known that I, EMERY L. WELCH, of Delphos, in the county of Allen and State of Ohio, have invented certain new and useful Improvements in Corn-Harvesters; and I do hereby declare the following to be a full, clear, and exact description of the invention, such as will enable others skilled in the art to which it pertains to make and use it, reference being had to the accompanying drawings, which form part of this specification.

My invention relates to improvements in corn-harvesters; and it consists in the combination of parts, which will be fully described hereinafter, and particularly referred to in the claims.

The object of my invention is to provide a corn-harvester capable of cutting several rows of corn and packing the same into any desired size shock, which is then dropped from a suitable dumping mechanism.

Figure 1:
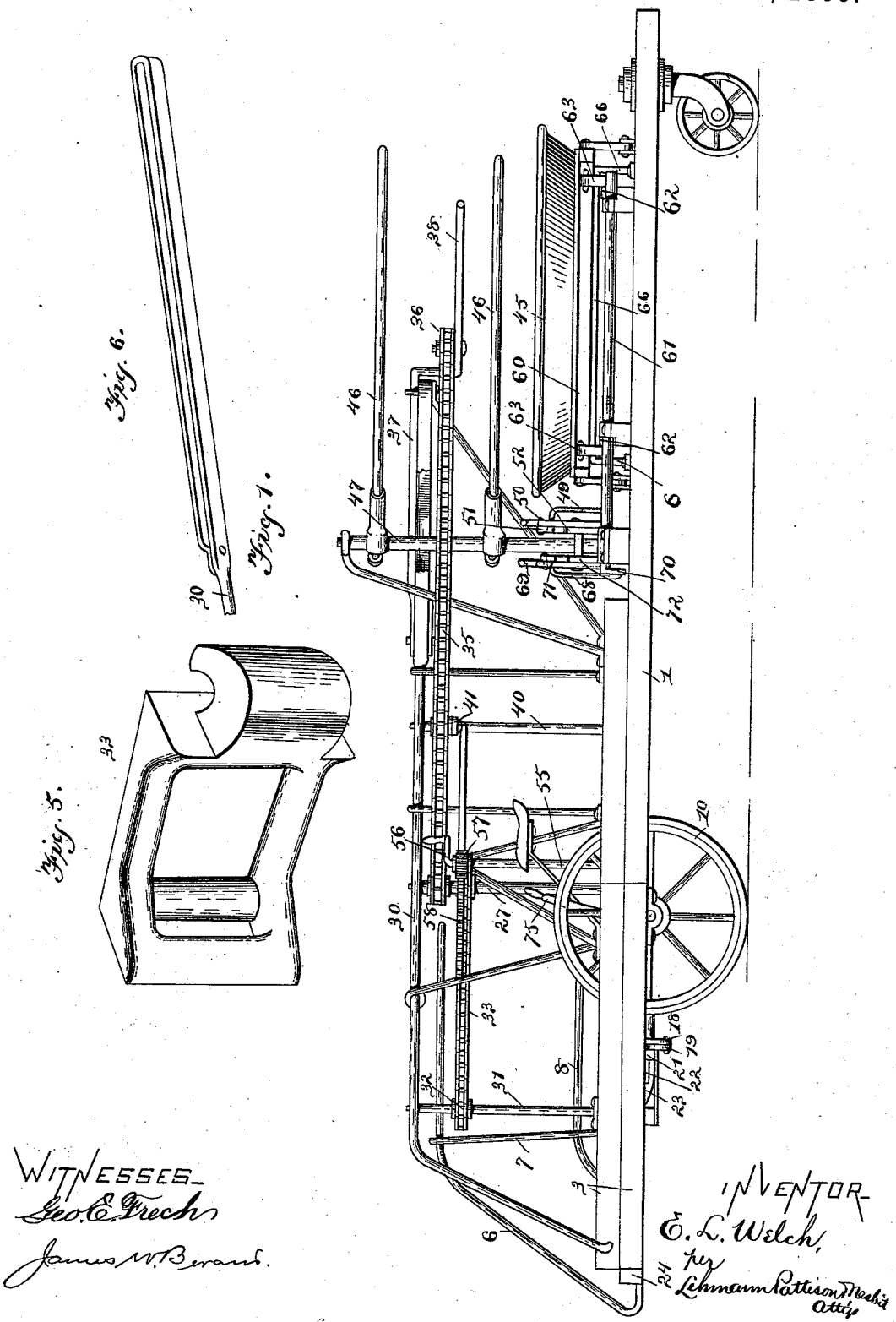
Figure 2:
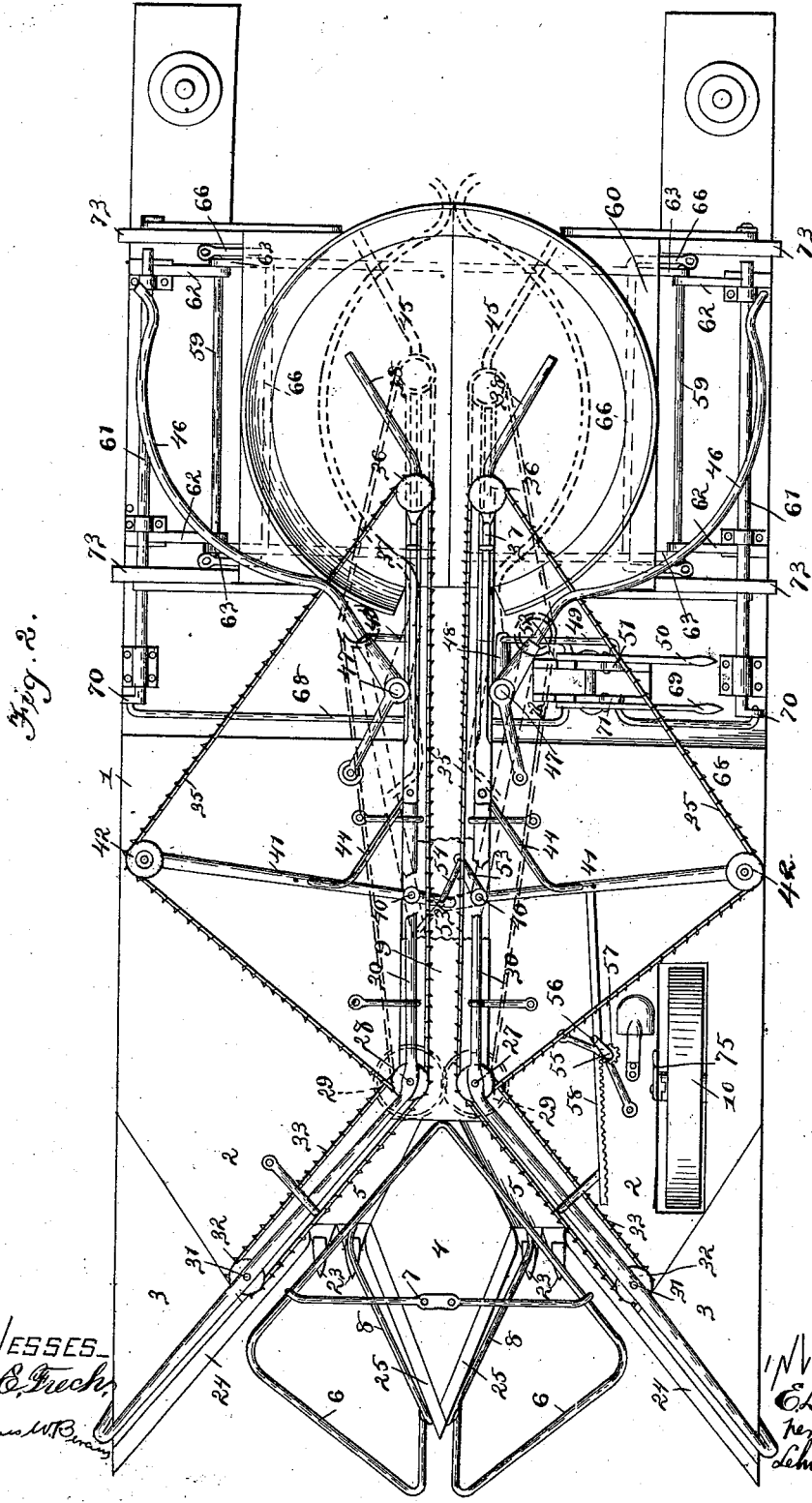
Figure 3:
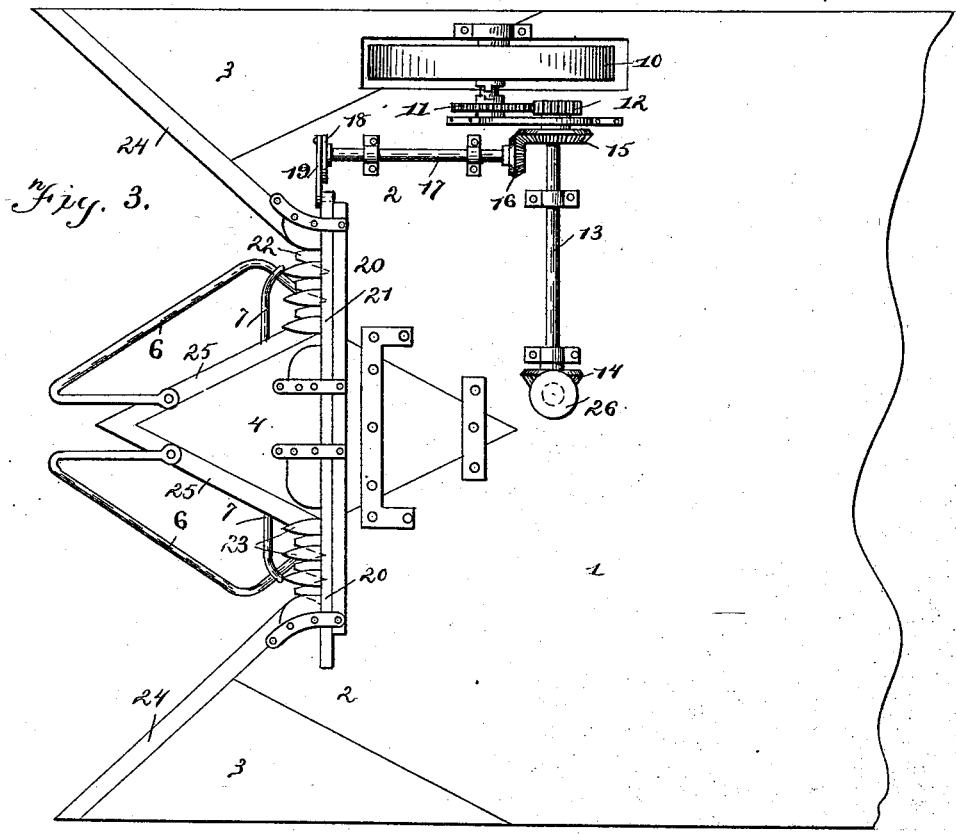
Figure 4:
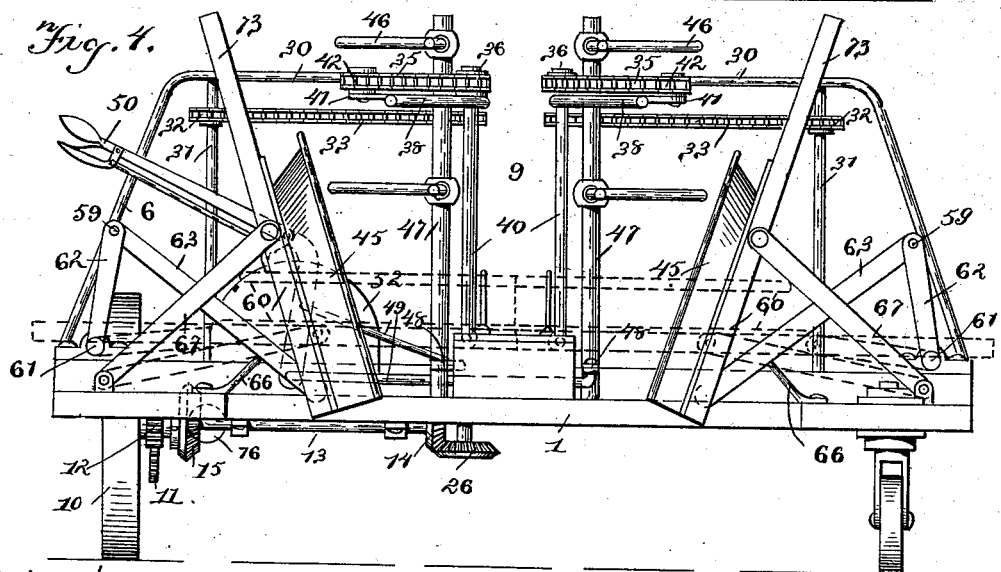

In the accompanying drawings, Figure 1 is a side elevation of my machine complete. Fig. 2 is a top plan view of the same. Fig. 3 is an inverted view of the driving-wheel, the cutting mechanism, and the connection between the driving-wheel and the mechanism upon the top of the harvester platform or frame. Fig. 4 is an enlarged rear end view showing the dumping mechanism in one position in solid lines and in another position in dotted lines. Fig. 5 is a detached view of one link forming the endless sprocket-chain. Fig. 6 is a perspective view of a portion of the framework 30, showing the longitudinal slot therein for the sliding compressors.

1 represents the frame or platform of the machine, which may either be made of a solid horizontal wooden platform, as here shown, or of a skeleton framework, as may be desired. The front end of this platform or framework 1 is provided with the pointed portions 2, and upon the outer sides of these pointed portions 2 are the angular portions 3. The center of this platform or framework is provided with a diamond-shaped guide 4, the central diamond-shaped or pointed portion 4 dividing or moving the stalks of two rows outward, and the angular and pointed portions 3 and 2 forming a guide at the outer side of the rows for guiding the corn inward to the cutters placed at the outer ends of the two guideways 5. The central pointed portion 4 has the wire or other suitable upward and rearward extending guides 6, which have their forward ends turned backward and secured to the under side of the pointed portion, and their upper portions supported by the U-shaped frame or arm 7. Beneath this guide 6 is an upwardly and rearwardly extending guide 8, having its forward ends secured to opposite edges of the central pointed divided portion 4, the rear or inner ends of both the guides 6 and 8 being pointed and at the center of the passage-way 9, through which the corn then passes. This passageway, through which the corn after being cut passes to the conveyers, packer, and dumper, will be described farther on in the proper relative arrangement, and I will now proceed to describe the driving mechanism of the machine.

Reference being had now to the inverted view of the machine which illustrated the driving mechanism, 10 represents the driving or bull wheel suitably journaled to the under side of the platform or framework, and to which is rigidly attached a cog or pinion 11. This cog or pinion 11 meshes with a pinion 12 rigidly attached to the outer end of a horizontal transversely-extending shaft 13 which carries at its inner end a pinion 14, which inner end and pinion 14 are a little to one side of the center of the machine. Near the outer end of this shaft 13 is a larger beveled cog or pinion 15 which meshes with a beveled pinion 16 on the inner end of a longitudinally-extending shaft 17 suitably journaled to the under side of the platform or framework 1. Attached to the outer end of this shaft 17 is a wrist-pin wheel 18, to which a pitman 19 has one end connected, the opposite end of the pitman 19 being pivotally connected to one end of the cutter 20. This cutter moves in suitable guideways under the frame or platform 1, and consists of a transversely-extending bar 21, carrying the cutter-blades 22, near each end, which move through the guard-fingers 23. From this it will be seen that the cutter is provided in each guideway of the front end of the machine for cutting two rows of corn, as previously described. The angular pieces 3 are held by screws passed through their inner ends into the framework 1, and their outer ends are connected with the portion 2 by means of the rods or bars 24, thus enabling these devices to be detached, if desired. The central pointed guide 4 is held in position by means of the detachable transverse metal plates 25 at the under side of the platform or framework 1, as illustrated in the inverted view, Fig. 3.

The pinion 14 at the inner end of the shaft 13 meshes with a pinion 26 on the lower end of a vertically-supported shaft 27. This shaft 27 is at one side of the front end of passage-way 9, and at the opposite side of this passage-way is another vertical shaft 28, and each of these shafts 27 and 28 are provided at their lower ends with the intermeshing gear-wheels 29. Owing to this construction, the shaft 27 receiving motion from the driving-wheel, as previously described, shaft 28 is driven through the medium of the pinions 29 from the shaft 27. The upper ends of these shafts 27 and 28 are journaled in the rods or framework 30 which extend rearward parallel with each other from the said shafts, and diverge forwardly from said shafts and parallel with the rearward-converging portions of the guides 6 and 8 upon the pointed portion 4, thus forming converging passage-ways for the corn to the central passage-way 9. Journaled at the forward end of the pointed portion 2 are the vertical shafts 31 carrying pulleys 32 near their upper ends, and around these sprocket-wheels sprocket-chains 33 pass and also pass around sprocket-wheels upon the shafts 27 and 28. The object of these sprocket-chains, which have their links of the construction shown in the detailed view, is to feed the corn forward first to the knives which cut, and then after being cut to carry it on forward to the central passage-way 9, whence it passes on, as will be presently described, to the packer and dumper. Above the endless chain 33 just described the shafts 27 and 28 are provided with sprocket-wheels around which endless sprocket-chains 35 pass, the opposite ends of said sprocket-chains passing around sprocket-wheels 36 near the outer end of the endwise-moving rods 37, which form a carrier and receiver or compressor, the said rod being guided in suitable guideways upon the framework 30, and beyond the said sprocket-wheels 36 the diverging fingers 38 are provided, which act upon the stalks to compress them into a bundle. At each side of the central passage-way 9 and near the center thereof are the vertical shafts 40, to which the inner ends of the arms 41 are rigidly attached, the outer ends of the said arms carrying sprocket-wheels 42, around which also the endless chains pass, as illustrated. These arms 41 are connected with the endwise-moving compressors by means of the links 44 having their ends respectively pivotally connected with the endwise-moving compressors and the arms.

The operation of this portion of my invention is as follows: The corn being cut and fed to the front end of the central passage-way 9, it is caught between the endless chains 35 and carried rearward between the diverging fingers 38, the lower ends of the stalks resting upon the dumper 45 and against the curved arms 46. The inner ends of these curved arms 46 are connected with the vertical shafts 47, situated at opposite sides and near the rear end of the central passage-way 9. As the corn accumulates between the diverging fingers of the compressors and fingers 46, the compressors are gradually forced inward until the desired size of shock is obtained. The corn is then bound in any suitable manner and dumped by a suitable mechanism, to be described further on. The shafts 47 each have an arm 48 extending outward therefrom, and these arms are respectively connected by means of rods 49 with the lever 50 above and below its pivotal point, respectively, so that when the said lever is moved the shafts are rotated in opposite directions, thus either bringing the diverging fingers 46 together or separating them. The lever 50 is provided with a suitable catch 51, which engages a segment 52 for holding the fingers 46 in any desired relation, as will be readily understood. The shafts 40, to which the arms 41 are attached, have at their lower ends the inwardly-extending arms 53, which are connected by means of a link 54, so that when one is moved the other is correspondingly moved. The object of these arms is to take up the slack of the sprocket-chains as the compressors move inward, thus preventing the chains from getting slack, as will be readily understood.

55 is a vertical shaft having an operating-handle 56 at its upper end and a pinion 57 which engages a rack 58, the inner end of said rack being connected with one of the arms 41. The object of this mechanism is that after the packer has been moved inward and the shock formed, the packer can then be forced outward again to form another shock, and the inward movement of the compressor can be regulated by this mechanism if so desired. The shock now being formed, bound and dumped, a movement of the lever 50 throws the fingers 46 outward so that the harvester can move forward without interfering therewith.

The dumper consists of the semicircular pans 45 rigidly attached to the platforms 60. Arms 63 have their inner ends pivotally connected with the inner ends of the platforms 60, and their outer ends pivotally connected with arms 62 through the medium of a bolt 59 which extends through the arms 62 and 63 and from one to the other. The arms 62 have their outer ends rigidly connected with the shafts 61. The arms 63 rest upon the inwardly-extending frame or support 66 intermediate their ends, which frame or support is preferably U-shaped in form and has its ends connected with the platform 1. These arms 63 through the medium of the arms 62 to which they are connected, the links 67, and the shaft 61 support the two sections of the dumper, as will be readily understood. The links 67 have their inner ends pivotally connected with the platforms 60 and their outer ends pivotally connected with the platform or framework 1. The object of these links 67 is to throw the outer ends of the dumping-pans and platforms upward and their inner ends downward, as shown in dotted lines, when the shafts 61 are partially rotated. The shafts 61 are rotated through the medium of rods 68, which extend in opposite directions from the lever 69 and have their ends connected respectively above and below the pivotal point of said lever so that the shafts are vibrated in opposite directions, the opposite and outer ends of said rods 68 being pivotally connected with depending arms or cranks 70 rigidly attached to the shafts 61. The lever 69 is provided with the catch 71 engaging a segment 72, so that it may be held in any desired relation and locked in that position, thus holding the dumping-pans in their proper positions. It is through the medium of this lever that the dumping is effected, though it may be effected through the medium of the outwardly-extending arms 73, which are connected to the platforms 60.

A lever 75 is provided near the driver's seat which will be connected with any desired form of clutch for throwing the driving mechanism in and out of operation.

Having thus fully described my invention, what I claim, and desire to secure by Letters Patent, is—

1. A harvester comprising a cutting mechanism, an endwise moving compressor, an endless carrier for delivering the cut corn to the compressor, the said compressor having a wheel around which the carrier passes, and an extensible means for engaging the said carrier for the purpose described.

2. A harvester comprising a cutting mechanism, a movable compressor, a swinging arm, and an endless carrier partly supported by said movable compressor and swinging arm, the arm and compressor being connected, the parts operating substantially as described.

3. A harvester comprising a cutting mechanism, an endwise moving compressor, an endless carrier for delivering the cut material to the stacker, said carrier partly supported and carried by the compressor, an extensible means engaging said chain, and a connection between said extensible means and the compressor, the parts combined substantially as described.

4. A corn harvester comprising a cutting mechanism, a compressor comprising two movable portions, two endless carriers each of which is partially supported and carried by said packer portions, an extensible means for each carrier, and connections between said extensible means and the packer, substantially as specified.

5. A corn harvester comprising a cutting mechanism, an endwise movable compressor, an endless carrier partly supported and carried by said compressor, an extensible means engaging said carrier for the purpose described, a connection between the extensible means and the compressor, and a connection between said extensible means for returning it and the packer to their starting positions, substantially as specified.

6. A corn harvester comprising a cutting mechanism, a compressor comprising two movable portions, two endless carriers, each partly supported and carried by said compressor portions, the carriers extending parallel at their adjacent sides, an outwardly extending pivoted arm for and engaging each carrier, a connection between said arms, and a connection between the arms and said compressor portions, substantially as described.

7. A harvester comprising a cutting mechanism, a dumper consisting of two members, outwardly extending arms 63 connected with each of said members, supports 66 engaging said arms intermediate their ends, crank shafts, the outer ends of said arms pivotally connected with the cranks of said shafts, and links having their inner ends loosely connected to the members intermediate their ends, and their outer ends connected with the frame of the machine, and a connection between said shafts, substantially as described.

In testimony whereof I affix my signature in presence of two witnesses.

E. L. WELCH.

Witnesses:
D. E. BAXTER, Jr.,
F. E. LONG.